US008473753B2

(12) United States Patent
Kass et al.

(10) Patent No.: US 8,473,753 B2
(45) Date of Patent: Jun. 25, 2013

(54) REAL-TIME SECURE SELF-ACQUIRING ROOT AUTHORITY

(75) Inventors: Eric Kass, Boeblingen (DE); Joachim Kern, Waldorf (GE)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 13/228,856

(22) Filed: Sep. 9, 2011

(65) Prior Publication Data

US 2012/0066512 A1    Mar. 15, 2012

(51) Int. Cl.
*G06F 11/00* (2006.01)
*G06F 21/71* (2006.01)

(52) U.S. Cl.
CPC ..................... *G06F 21/71* (2013.01)
USPC ............... 713/189; 713/168; 726/3; 709/217; 709/220; 709/221; 709/222; 709/223; 717/168

(58) Field of Classification Search
USPC ....... 713/168, 189; 726/3; 709/217, 220–223; 717/168
See application file for complete search history.

(56) References Cited

U.S. PATENT DOCUMENTS

| 2002/0152392 A1* | 10/2002 | Hardy et al. ................. 713/189 |
| 2008/0046371 A1* | 2/2008 | He et al. .......................... 705/51 |
| 2009/0150525 A1* | 6/2009 | Edgett et al. ................. 709/220 |
| 2009/0282477 A1* | 11/2009 | Chen et al. ....................... 726/22 |
| 2009/0288071 A1* | 11/2009 | Seidman et al. .............. 717/126 |
| 2010/0058317 A1* | 3/2010 | Braams .......................... 717/171 |
| 2010/0288071 A1* | 11/2010 | Klossek et al. ................. 74/519 |
| 2011/0137680 A1* | 6/2011 | Sweeney ............................ 705/3 |

FOREIGN PATENT DOCUMENTS

| WO | WO 98/45768 | 10/1998 |
| WO | WO 2005/069135 A1 | 7/2005 |
| WO | WO 2007/005363 A1 | 1/2007 |

OTHER PUBLICATIONS

*Secure Software Updates: Disappointments and New Challenges*, Bellissimo et al., Department of Computer Science, University of Massachusetts Amherst, http://prisms.cs.umass.edu/.
*Why Silent Update Boost Security*, Duebendorfer et al., ETH Tech Report TIK 302, http://www.techzoom.net/silent-updates.

* cited by examiner

*Primary Examiner* — Beemnet Dada
*Assistant Examiner* — Sayed Beheshti Shirazi
(74) *Attorney, Agent, or Firm* — J. B. Kraft; Steven L. Bennett

(57) ABSTRACT

When software is delivered to a customer, there are often programs or routines of programs that a software distributor intended to run under the credentials of a specific user other than the user who started the program. A secure method is proposed for software running in a process to acquire rights to issue restricted operations. A trusting entity trusts a process based on verifying ownership of code residing in the process. The trusted process is granted rights by the trusting entity to perform any or specific operations under the credentials of a specific user, not necessarily the current process user.

9 Claims, 2 Drawing Sheets

REAL-TIME SECURE SELF-ACQUIRING ROOT AUTHORITY

TECHNICAL FIELD

The present invention relates generally to a possibility to update parent software without requiring the same root privilege initially required when pre-installing the parent software, and more particularly to a computer implemented method for executing an application of the parent software without root privilege. It is also related to a computer program product comprising a computer readable storage medium having computer readable program code to perform any of the method steps. The present invention is further related to a client computer environment for processing the computer implemented method.

BACKGROUND OF RELATED ART

Generally, two types of accounts are used to log a user on to a computer's operating system. One has nearly unlimited rights, often called an administrator account with root privilege, the other has limited rights (less privilege), often called a standard user account. Standard user accounts permit some tasks but prohibit others. They permit most applications to run on the computer but often prohibit installation of an application, alteration of the computer's system settings and execution of certain applications. Administrator accounts with root privilege, on the other hand, generally permit most if not all tasks.

Not surprisingly, many users log on to their computers with administrator accounts so that they may, in most cases, do whatever they want. There are significant risks involved in using administrator accounts. Malicious code may, in some cases, perform whatever tasks are permitted by the account currently in use, such as installing and deleting applications and files—potentially highly damaging tasks while impersonating the current user of the computer—thus, if a user is logged on with an administrator account, the malicious code may perform dangerous tasks permitted by that account.

To reduce these risks, a user may instead log on with a standard user account. Logging on with a standard user account may reduce these risks because the standard user account may not have the right to permit malicious code to perform many dangerous tasks. If the standard user account does not have the right to perform a task, the operating system may prohibit the malicious code from performing that task. For this reason, using a standard user account may be safer than using an administrator account.

The user may be prohibited from performing legitimate tasks—like installing a file known to be safe. To install this file, the user may need to switch to an account that has a right to permit the task. To do so with relative safety, the user may need to log off from the standard user account, log on to an administrator account, install the file, log off from the administrator account and then log back on with the standard user account. This is disruptive.

To reduce this disruption, a user's rights may temporarily be elevated to permit a desired task. For example, the user's rights may be elevated to those corresponding to rights held by an administrator account. Thus, a user may temporarily use the privileges of the selected account so that the task may be run to completion. Once the task is completed, the rights of the user may then return to those of his or her account such that these temporary privileges cease. In U.S. Pat. No. 7,617, 530 there are described systems and/or methods that enable a user to elevate his or her rights.

SUMMARY OF THE PRESENT INVENTION

In view of the above, it is, thus, an object of the present invention to alleviate the above-referenced drawbacks by providing a computer implemented method, a computer program product and a client computer allowing the update of parent software in a particularly facile way without requiring the involvement of a user with root privilege.

A secure method is proposed for software running in a process to acquire rights to issue restricted operations. A trusting entity trusts a process based on verifying ownership of code residing in the process. The trusted process is granted rights by the trusting entity to perform any, or specific, operations under the credentials of a specific user, not necessarily the current process user.

According to a first aspect of the embodiment of the present invention a computer implemented method for executing an application of parent software on a client computer environment comprises following steps. Pre-installing the parent software using a root privilege on the client computer environment, the parent software comprises a trusted software module being an agent having authority to grant authority to a requesting program for performing a restricted task. Updating the parent software, without root privilege, by installing on the client computer environment a signed application software. Running the application software while an activation of a restricted task using the application software on the client computer environment calls the agent from the parent software running with the authority of root privilege to query the underlying operating system for the content loaded by that application software. Verifying, by the agent, that content is recognizable by the parent software. In the case when it is recognized then the agent will validate that content and afterward the restricted task activated by the application software is performed.

According to an alternative aspect, the agent is acquiring a list of modules representing the content loaded by the application software when updating the parent software. The agent is then querying the operating system for a subsequent recognition by the parent software of the listed modules from the application software.

According to another alternative aspect, the agent, when verifying that the content loaded by the application software is being recognized by the parent software, verifies a signature of that content to be validated as a signature accepted by the parent software. Such verification can be performed by the agent by verifying the signature of each module building the content loaded by the application appended to or associated with each module. It is an advantage that the modules of the application software are individually signed using some signature appended to or associated with each module.

The verification of the signature by the agent can be performed by applying the following steps. A message digest is built from the module using a one way hash function. The decrypted signature of the module is read using a public key associated to the parent software. Afterward, the decrypted signature is compared with the message digest and if equal then the module is validated; otherwise an error message is returned to the application software.

A computer program product and a system as a client computer environment corresponding to the above-summarized methods are also described and claimed herein.

Additional features and advantages are realized through the techniques of the present invention. Other embodiments and aspects of the invention are described in detail herein and are considered to be a part of the claimed invention. For a better understanding of the invention with advantages and features, refer to the description and to the drawings.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
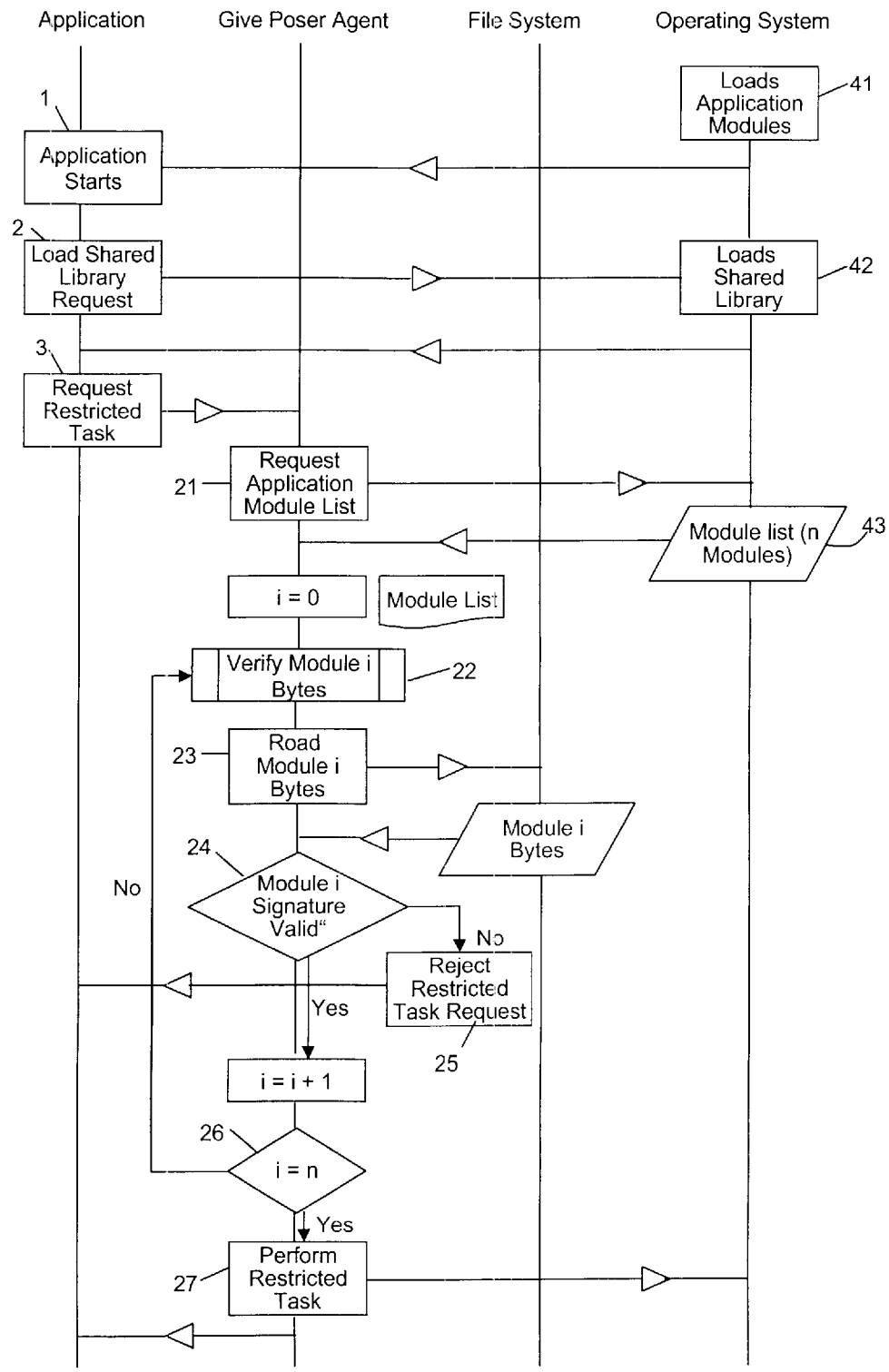
FIG. 1 illustrates one example of a flowchart according to the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared or semiconductor system, apparatus or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device or any suitable combination of the foregoing. In the context of this document, a computer readable storage medium may be any tangible medium that can contain or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN) or the connection may be made to an external computer (for example, through the Internet using an Internet Service Provider (ISP)).

Aspects of the present invention are described below with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer program instructions. These computer program instructions may be provided to the processor of a general purpose computer, special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

Referring now to FIG. 1, a secure method is proposed for software running in a process to acquire rights to issue restricted operations. A trusting entity trusts a process based on verifying ownership of code residing in the process. The trusted process is granted rights by the trusting entity to perform any or specific operations under the credentials of a specific user, not necessarily the current process user.

At first, some parent software delivered by some software provider is pre-installed on the client computer using some root privilege. This is usually performed by some administrator owning an administrator account with root privilege on the client computer. The parent software comprises a trusted software module—also installed on the client computer environment—being an agent having authority to grant authority to a requesting program when performing a restricted task. In one specific instance, according to the invention, the software provider delivers an update (application software) to the parent software by, for example, an automatic patch delivery system. When this application software must run under the credentials of a specific user and a restricted task is activated by that application software, then, following, the secure method is applied according to the invention, using industry standard practices to allow a program to acquire the credentials of another user during runtime.

FIG. 1 shows a flowchart of a real-time root basic algorithm according to the invention. A request to start an application is issued, usually by some user, to the operating system (OS) of the client computer environment. The OS loads application code (application modules) 41 accordingly from one or more file system objects (modules). The operating system schedules a process to execute application code 1. While running, the application software may explicitly request additional code be loaded dynamically or some application modules may be loaded by the operating system at first touch of a function 2. In either case, the OS loads additional application code into the process 42, possibly being from a shared library.

At some stage, the application needs to perform a restricted task or perform a task as a specific user, not necessarily the current user. The task may include changing the user under which the application is running such that the application can perform restricted tasks as a different user. The application software then sends a request to the Give-Power-Agent from the parent software for performing the restricted task (3). That agent will have to verify the content of the application software that requested to perform a restricted task before allowing it to perform the restricted task.

The Give-Power-Agent queries the operating system for the list of modules loaded in the application process (21) (43). The agent then starts to verify that each of those n modules can be trusted, i.e. are really provided by the software provider from the parent software without any malicious extra code. For each module i in the list of modules (non-OS), the Give-Power-Agent applies the following procedure:
 1. Verifies that the module in the module list is the one currently residing in the file system (22).
 2. Reads the bytes of the module from the file system (23) (31).
 3. Verifies that the signature of the module in the file system is indeed the one that was signed by the author of the application software (24).

An example for such verification could look like the following:
 a. A message digest (A) is built from the module bytes using a one way hash function (SHA, MD5, etc.).
 b. The signature of the module is read from a separate file in the file system or extracted from the end of module itself.
 c. The signature is decrypted with the public key of the application author; resulting in message digest (B).
 d. The message digests (A) and (B) are compared. If they are equal, the signature is valid.
 4. In the case where the signature of a module is invalid, an error is returned to the application (25), otherwise the verification is performed for all the modules n 26.
 5. After all the modules are successfully validated (i.e. all non-OS modules are authored by the application software author and is, therefore, being recognized by the parent software), the Give-Power-Agent performs the required restricted task (27).

In this context, an OS module is one residing in a protected directory to which only the root user or an equivalent has write authority. When validating the modules loaded in the process, an instance of the invention could rely on the OS itself for having previously ensured the integrity of its own modules. Since OS modules reside in protected directories, there is no risk that a Trojan horse could have embedded itself within an operating system module. With this assumption, there is no need for the parent software to validate these OS modules.

Figure 2:
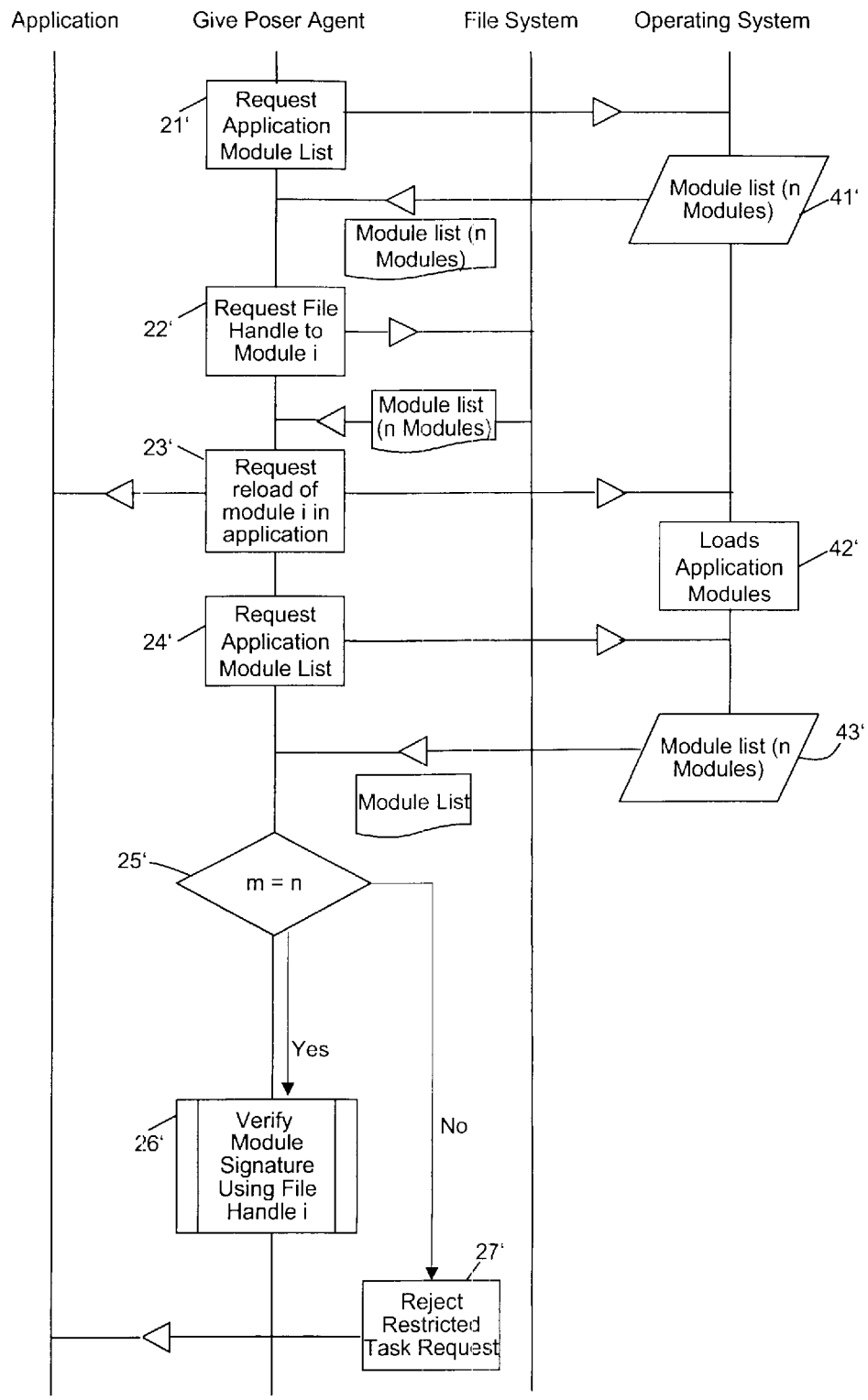
FIG. 2 illustrates one example of a flowchart according to the invention.

In FIG. 2 is shown a flowchart for a real time root module reload verification procedure. Such procedure is achieved by applying the following algorithm that provides one mechanism to verify that a module in a file system is indeed the module that has been loaded. For $i^{th}$ module of the Give-Power-Agent (the agent from the parent software) applies following steps:
 1. Queries the operating system for the list of modules loaded in the application process (21') (41'). This list contains a list of n modules.
 2. Retrieves a file handle (i.e. open) to the module in the file system (22'). This handle will be used later to read the bytes of the module for verifying the module's signature.
 3. Have the OS reload the module into the application process (23'). If the module has already been loaded as determined by the OS based on the file node ID of the module, the module will not be reloaded.
 4. Queries the OS for the list of modules loaded in the application process (24') (43'). This list contains a list of m modules.
 5. Compares n to m (25'):
  a. If they are unequal the $i^{th}$ module just loaded was different than the one loaded by the application; in this case the verification fails and the application is alerted that the restricted task cannot be performed (27').
  b. If they are equal, verification is successful and the Give-Power-Agent can proceed to verify the signature of the module (26').

In the following description QSECOFR (root) is a user that has sufficient authority to grant a process the ability to run under the credentials of a user referred to as POWER. The following description also describes a specific instance of the invention running on the IBM i OS, for example. An important feature according to the present invention is to sign each software module that is delivered to customers. This software can, at some step, require running certain tasks under the authority of a specified user. These software modules are collectively referred to as 'WantPWRProgram'. Residing at the customer location is a trusted software module that has authority to grant authority to a requesting program. This trusted software module is referred to as 'GIVEPOWER'.

At run-time, a process running 'WantPWRProgram' requires the ability to carry out a task as a specified user, the trusted module 'GIVEPOWER' verifies the identity of the program code (modules of 'WantPWRProgram') running in the process space. To carry out the above, two steps are required (Build-time and Run-time) as described below:

I Build-Time (at Software Company)

For each (non-OS) module$_i$ of WantPWRProgram:
digest$_i$=BuildMessageDigest(module$_i$)
sign$_i$=RSA(digest$_i$,private);
Deliver module$_i$ and sign$_i$ to customers:
 a. Either: append sign$_i$ to moduleBIN$_i$
 b. Or: deliver sign$_i$ as separate signature file.

II Run-Time (at Customer)

In the Preferred Embodiment

GIVEPOWER is an ILE Program which runs with QSECOFR adopted (root) authority. (GIVEPOWER was installed by the system administrator to run as owner QSECOFR). WantPWRProgram calls GIVEPOWER (in the same process)

The signatures of all shared libraries (other than operating system libraries) are verified to prevent a rogue shared library from coercing the main WantPWRProgram to acquire credentials on behalf of the rogue shared library.

1. Uses loadquery( ) to acquire the list of modules loaded into the process
2. For each (non-OS) module of WantPWRProgram:
   a. moduleFD$_i$=open(module$_i$)
   b. dlopen(module$_i$)
3. loadquery( )
   a. if module list same—paths valid
   b. else→ABORT!
4. For each module$_i$
   a. dlclose(module$_i$)
5. For each module$_i$
   a. moduleBIN$_i$=read(moduleFD$_i$)
   b. digest=BuildMessageDigest(moduleBIN$_i$)
   c. acquire signature of module$_i$→sign$_i$
   d. check=RSA(sign$_i$,public)
      i. if (check < > digest)→ABORT!
6. Provide WantPWRProgram with requested authority:
   a. Either: switch user of WantPWRProgram process to POWER
   b. Or: execute desired task as POWER user.

The signature for each module can be implemented in different ways. For example, the signature is appended to the end of the module residing in the file system. In this case, 'ModuleBIN' is the binary data of the module excluding the appended signature. An alternative could be that the signature is delivered in a separate file. In this case, 'ModuleBIN' is the binary data of the entire module.

In some alternate embodiments the following OS requirements should be fulfilled:

1. Ability of an in-process program or separate service process, GIVEPOWER, running under a specific authority to change the runtime authority (change or impersonate a user) of the WantPWRProgram process.
   a. Alternatively, GIVEPOWER could simply complete a desired task requested by WantPWRProgram under a specific user without actually changing the runtime authority of the WantPWRProgram process.
2. Ability for GIVEPOWER to acquire a list of all shared libraries loaded into WantPWRPrograms process.
3. Ability for GIVEPOWER to be certain that the path+ program/shared library are ones currently loaded by the process (if the OS permits that WantPWRProgram or any dependent shared library be moved or rename whilst WantPWRProgram is active).

The capabilities of the present invention can be implemented in software, firmware, hardware or some combination thereof.

As one example, one or more aspects of the present invention can be included in an article of manufacture (e.g. one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order or steps may be added, deleted or modified. All of these variations are considered a part of the claimed invention.

Although certain preferred embodiments have been shown and described, it will be understood that many changes and modifications may be made therein without departing from the scope and intent of the appended claims.

What is claimed is:

1. A computer implemented method for executing a parent software application on a client computer comprising:
   pre-installing a parent software application with root privilege on said client computer, said parent application comprising a trusted software module acting as an agent having authority to grant authority to a requesting computer program to perform a restricted task;
   updating, without root privilege, said parent application by installing a signed software application on the client computer;
   during the running of the signed application on the client computer, calling said agent from said parent application running with the authority of said root privilege to query the operating system of the client computer for a list of modules for said querying of said operating system for subsequent recognition by said parent application from said installed signed application;
   verifying said list of modules by said agent as recognized by said parent application to be validated; and
   responsive to said verifying of said list of modules, verifying, by said agent, the signatures of each of said modules in said list of modules in said content to be validated as signatures accepted by said parent application.

2. The computer implemented method of claim 1, wherein each of said modules is individually signed by using a signature respectively associated with each module.

3. The computer implemented method of claim 2, wherein said signatures are verified by a method comprising:
   building a message digest from said module by a one way hash function;
   reading the signature of the module;
   decrypting the signature using a public key associated with the parent application;
   comparing the decrypted signature to said message digest; and
   when said comparing result is equivalent, validating said module, or when said comparing result is not equivalent, returning an error message to said software application.

4. A computer controlled system for executing a parent software application on a client computer comprising:
   a processor; and
   a computer memory holding computer program instructions which when executed by the processor perform the method comprising:
   pre-installing a parent software application with root privilege on said client computer, said parent application comprising a trusted software module acting as an agent having authority to grant authority to a requesting computer program to perform a restricted task;
   updating, without root privilege, said parent application by installing a signed software application on the client computer;
   during the running of the signed application on the client computer, calling said agent from said parent application running with the authority of said root privilege to query the operating system of the client computer for a list of modules for said querying of said operating system for subsequent recognition by said parent application from said installed signed application;

verifying said list of modules by said agent as recognized by said parent application to be validated; and responsive to said verifying of said list of modules, verifying, by said agent, the signatures of each of said modules in said list of modules in said content to be validated as signatures accepted by said parent application.

5. The system of claim 4, wherein in said performed method, each of said modules is individually signed by using a signature respectively associated with each module.

6. The system of claim 5, wherein in said performed method, said signatures are verified by:

building a message digest from said module by a one way hash function;

reading the signature of the module;

decrypting the signature using a public key associated with the parent application;

comparing the decrypted signature to said message digest; and when said comparing result is equivalent, validating said module, or when said comparing result is not equivalent, returning an error message to said software application.

7. A computer usable non-transitory storage medium having stored thereon a computer readable program for executing a parent software application on a client computer, wherein the computer readable program when executed on a computer causes the computer to:

pre-install parent software application with root privilege on said client computer, said parent application including a trusted software module acting as an agent having authority to grant authority to a requesting computer program to perform a restricted task;

update, without root privilege, said parent application by installing a signed software application on the client computer;

during the running of the signed application on the client computer, call said agent from said parent application running with the authority of said root privilege to query the operating system of the client computer for a list of modules for said querying of said operating system for subsequent recognition by said parent application from said installed signed application;

verify said list of modules by said agent as recognized by said parent application to be validated; and responsive to said verifying of said list of modules, verify, by said agent, the signatures of each of said modules in said list of modules in said content to be validated as signatures accepted by said parent application.

8. The computer readable program of claim 7, wherein each of said modules is individually signed by using a signature respectively associated with each module.

9. The computer readable program of claim 8, wherein said computer readable program causes said signatures to be verified by causing the computer to:

build a message digest from said module by a one way hash function;

read the signature of the module;

decrypt the signature using a public key associated with the parent application;

compare the decrypted signature to said message digest; and when said comparing result is equivalent, validate said module, or when said comparing result is not equivalent, return an error message to said software application.

\* \* \* \* \*